J. L. FORD & S. C. LEACOCK.
STRADDLE ROW CULTIVATOR.
APPLICATION FILED FEB. 3, 1912.
1,051,209.
Patented Jan. 21, 1913.
3 SHEETS—SHEET 2.
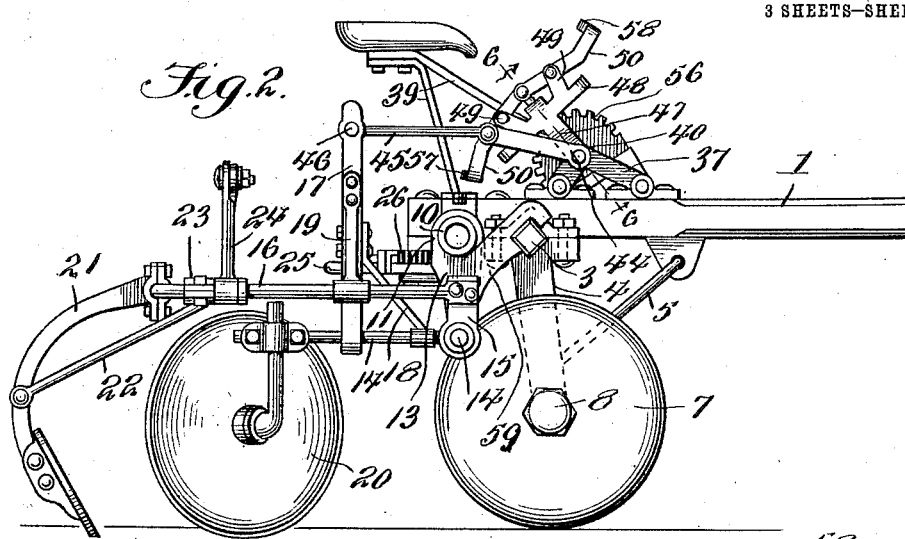
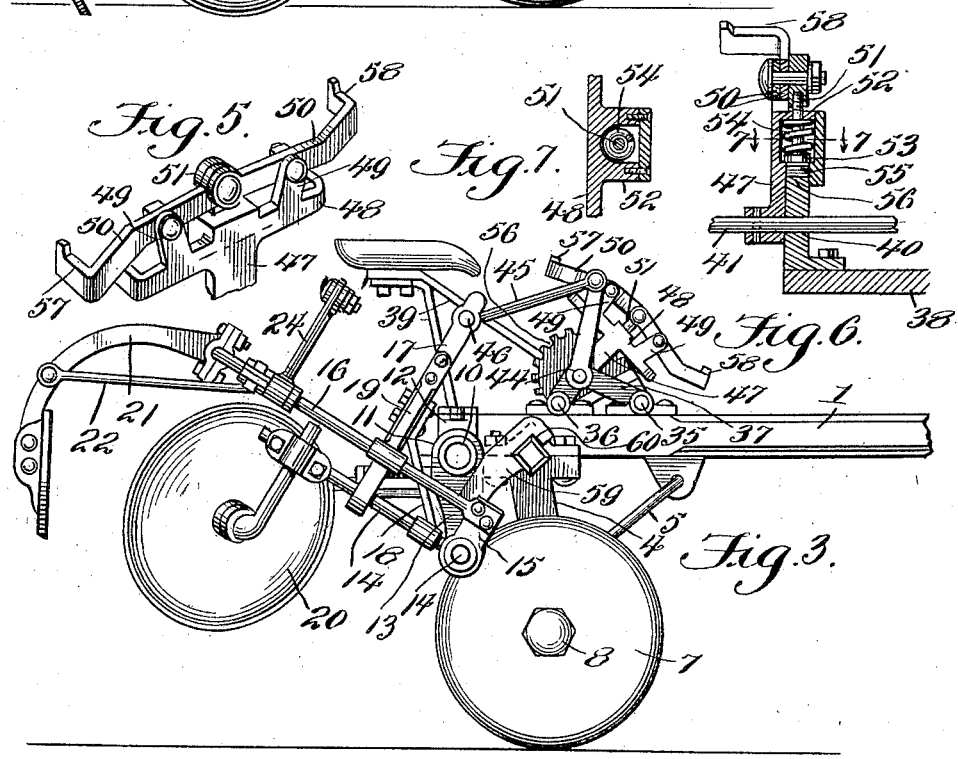
Witnesses
J. T. L. Wright.
E. Edwouston
Inventors
John L. Ford,
Seth C. Leacock
By Victor J. Evans,
Attorney J. L. FORD & S. C. LEACOCK.
STRADDLE ROW CULTIVATOR.
APPLICATION FILED FEB. 3, 1912.
1,051,209.
Patented Jan. 21, 1913.
3 SHEETS—SHEET 3.
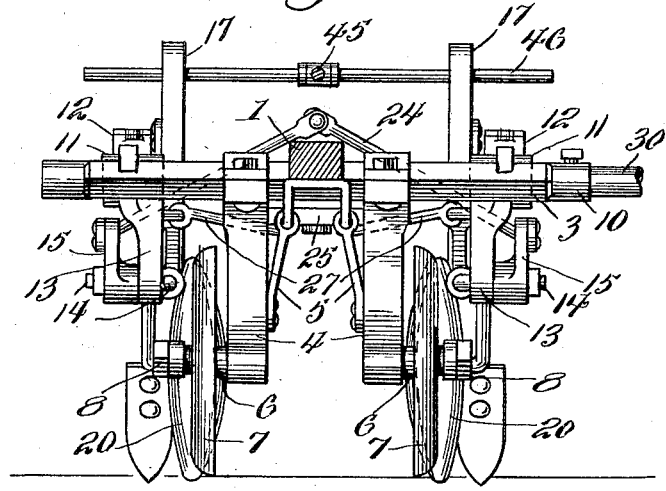
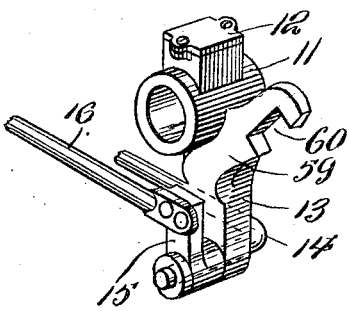
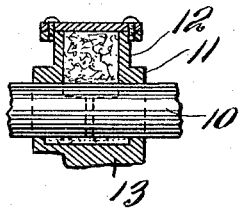
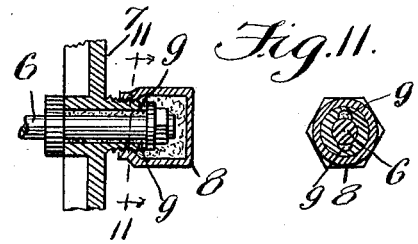
Witnesses
J. T. L. Wright
C. Edwerton
Inventors
John L. Ford,
Seth C. Leacock,
By Victor J. Evans,
Attorney

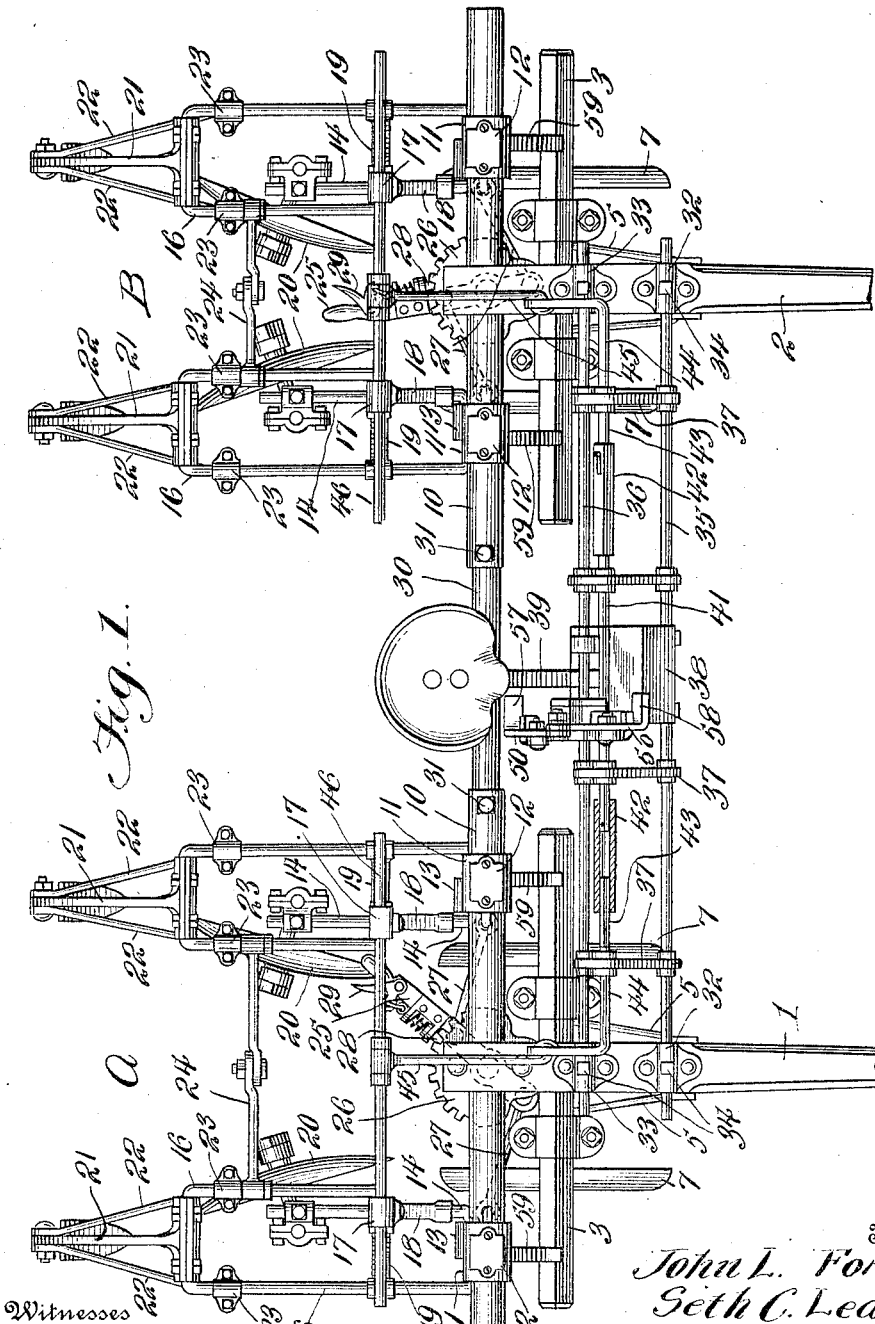

UNITED STATES PATENT OFFICE.

JOHN L. FORD AND SETH C. LEACOCK, OF VALLEY, NEBRASKA.

STRADDLE-ROW CULTIVATOR.

1,051,209. Specification of Letters Patent. Patented Jan. 21, 1913.

Application filed February 3, 1912. Serial No. 675,109.

*To all whom it may concern:*

Be it known that we, JOHN L. FORD and SETH C. LEACOCK, citizens of the United States, residing at Valley, in the county of Douglas and State of Nebraska, have invented new and useful Improvements in Straddle-Row Cultivators, of which the following is a specification.

This invention relates to cultivators and more particularly to that type of straddle row cultivators employing a pair of units for cultivating separate rows simultaneously.

One of the principal objects of the invention is the provision of means for conveniently and simultaneously raising the cultivating elements of both units from the ground and for holding them in such raised position whereby the turns at the end of the rows may be made and whereby the machine may be driven from place to place with the cultivating elements raised from the ground.

A further object of the invention is the provision of a machine of this character having mechanism for raising simultaneously the separate units and further mechanism for adjusting the distance apart of the units independently of the operation of the raising and lowering mechanism so that this latter mechanism may be operated irrespective of the adjustment of the units.

A still further object of the invention is the provision of a machine of this character having the aforesaid adjustment and being provided with means to adjust the separate cultivator elements of each unit so that the cultivation of the rows may be accomplished with the cultivating elements set the proper distance from the crop being cultivated.

Further objects of this invention will appear as the following specific description is read in connection with the accompanying drawings, which form a part of this application, and in which:—

Figure 1 is a top plan view. Fig. 2 is a side elevation. Fig. 3 is a similar view with the units raised. Fig. 4 is a front elevation of one of the units. Fig. 5 is a detail perspective view of the controlling lever of the raising and lowering mechanism. Fig. 6 is a detail sectional view on the line 6—6 of Fig. 2. Fig. 7 is a sectional view on the line 7—7 of Fig. 6. Fig. 8 is a detail perspective view of one of the beam mounting brackets. Fig. 9 is a detail sectional view therethrough. Fig. 10 is a detail sectional view through one of the supporting wheels. Fig. 11 is a section on the line 11—11 of Fig. 10.

Referring more particularly to the drawing, 1 and 2 represent separate poles or draft devices of the units. As each unit is identical in structure, a single unit will be described, in so far as its parts are concerned to the connection between the two which includes the raising and lower mechanism will be described hereinafter.

Secured to the underneath side of the pole is a transverse rectangular shaft 3 which has depending therefrom on opposite sides of the pole, the supporting bracket arms 4 which are adjustably mounted upon the shaft, as shown, and which are connected to the pole by diagonal struts 5. The lower end of these bracket arms are provided with laterally extending pintles 6 upon which are journaled the supporting wheels 7 and threaded upon the hub of each wheel is a grease cup 8 which, when forced upon the hub, presses grease therein and through the opening 9 in the hub to the bearing. Immediately behind the shaft 3 there is secured to the rear end of the pole, a tubular shaft 10 upon which is slidably mounted a sleeve bearing 11 carrying lubricating boxes 12 upon their upper end and being provided with a depending supporting arm 13 in which are journaled the forward ends of the cultivator beams 14. Secured to the cultivator beams at their inner ends are crank arms 15, to the outer end of which is secured one end of a substantially U-shaped plow beam 16, the opposite terminals of which are connected to vertical arms 17 which are mounted upon the cultivator beams 14 and are braced in upright position by diagonal struts 18 and 19 connected thereto and to the cultivator beams and plow beams respectively. The outer ends of the cultivator beams 14 have adjustably mounted thereon the cultivator disks 20 while the yoke portions of the plow beams have rotatably mounted thereon, the shovel standards 21 which are braced to the beams by lengths 22 pivotally connected to the shovel standards and to sleeves 23 which are adjustably secured upon the plow beams. Both plow beams are connected together, as shown, by a toggle link 24 and are adjusted toward and away from each other by a lever 25 which is pivoted to operate over a segment 26 carried upon the underneath side of the tongue or pole. This lever is connected by means of links 27 to the opposite sleeves 11 in such a manner that movement of the lever in one direction will draw the sleeves together, while the opposite movement will force the sleeves apart. A spring pressed pawl 28 controlled by a bell crank 29 is adapted to lock the lever 25 in its adjusted position on the segment.

In order to connect the units, which will be hereinafter termed A and B, a connecting shaft 30 is slidably mounted in the tubular shafts 10 and held rigid therewith by set screws 31 threaded into the end of each tubular shaft 10. By adjusting the tubular shaft 10 upon the shaft 30, the distance apart of the units A and B may be properly controlled so as to accommodate the device to rows having different separation.

Secured to the poles of each unit are bearings 32 and 33 in which are adjustably secured by means of the set screws 34 seat supporting rods 35 and 36, both of which are connected together at suitable intervals by the bridge pieces 37 and by the seat supporting block 38. This seat supporting block carries the usual seat mounting 39 and is supplied with a bearing 40 in which a shaft 41 is journaled. This shaft is constructed with sleeves 42 keyed to its outer end and adapted to receive the squared ends 43 of the crank shafts 44 which are journaled in bearings formed in the bridge pieces 37 in such a manner that they are permitted to rotate and to slide when necessary. The crank ends of the shafts 44 are pivotally connected to links 45 which have their opposite ends journaled upon transverse shafts 46 slidably mounted in the arms 17 in such a manner as to permit adjustment of the beams 16 toward and away from each other. When the shaft 41 is rotated in one direction, the crank shafts 44 through the links 45 and the shaft 46 will raise the plow and cultivator beams to the position shown in Fig. 3 or to any intermediate position therebetween and the ground. The depth of the cultivation may be thus regulated or the cultivating elements raised entirely from the ground for turning at the end of rows or for transporting the machine from point to point. In order to rotate the shaft 41 in its bearings, there is keyed thereto an arm 47 having a transverse head 48 which is provided with diverging bearing members 49 in which are pivoted the foot levers 50. These foot levers are connected in their center, as shown, and to a pawl operating rod 51 which extends down through a box 52 upon the upper end of the arm 47 and has surrounding the same between the box and a collar 53 a spiral spring 54 which normally holds the rod 51 compressed so that the pawl 55 at the lower end thereof will engage the segmental rack 56 formed on the upper end of the bearing 40. The ends of the levers 50 are bent laterally so as to provide foot pieces 57 and 58 which the operator alternately engages in raising and lowering the cultivating elements from the ground, for instance, if he desires to raise the elements, his foot is placed upon the piece 58 and the lever operates the releasing pawl. A forward pressure will move the arm 47 over the segment and will rotate the shaft 41 and thus through the intermediate parts raise the plow and cultivator beams. The same operation is carried out in lowering the plow and cultivator beams with the exception, in this instance, the operator preferably operates the device by placing his foot upon the piece 57.

In order to prevent the arms 13 from turning upon the tubular shafts 10, there are secured to said arms diverging fingers 59 having notches 60 therein to receive the rectangular shafts 3.

What is claimed is:—

1. A cultivator composed of a pair of adjustably connected cultivating units, each unit comprising a draft device, a rectangular shaft connected thereto, supporting wheels adjustably mounted on the shaft, a beam supporting shaft, beam mounting devices slidably mounted thereon, means for adjusting the beam mounting devices longitudinally of the shaft, and a brace carried by the beam mounting devices and slidably engaged with the rectangular shaft and adapted to prevent rotation of the beam mounting devices on the beam supporting shaft.

2. A cultivator post, a pair of adjustably connected cultivating units each comprising a draft device, a wheel supporting shaft secured to and extending on opposite sides of the draft device, supporting wheels mounted thereon, a beam supporting shaft, beam supporting devices slidably mounted upon said shaft, means for adjusting the relative position of the beam supporting devices upon said shaft, braces carried by the beam supporting devices and slidably engaged with the wheel supporting shaft to prevent rotation of the beam supporting devices, beams carried by the supporting devices, and means for simultaneously raising the beams of each unit.

3. In a device of the class described, the combination with separate cultivator units, each comprising in part pivoted cultivator beams, means for adjusting the beams toward and away from each other and bearing arms carried by the beams, of supporting shafts adjustably connected to each unit, a seat supporting member carried by said shafts, means interconnecting the shafts, an extensible shaft journaled in said means, rods slidably mounted in said arms, crank and link connections between said rods and the extensible shaft, and means for rotating the extensible shaft.

4. In a device of the class described, the combination with separate cultivator units, each comprising in part pivoted cultivator beams, an adjustable connection between the units, a pair of parallel rods adjustably connected to each one of the units, bridge pieces connecting said rods, a seat supporting block bridged between said rods and having a bearing thereon, an extensible shaft journaled in the bearing and in the bridge pieces, cranks on the ends of said shaft, rods slidably mounted in bearings on the beams of each unit, a link connecting said rods and the cranks, a foot operated lever keyed to the extensible shaft, adjacent the bearing, and means for holding the lever in adjusted position.

In testimony whereof we affix our signatures in presence of two witnesses.

JOHN L. FORD.
SETH C. LEACOCK.

Witnesses:
CARL L. BRADLEY,
WILLIAM E. SPRAGUE.

Copies of this patent may be obtained for five cents each, by addressing the "Commissioner of Patents, Washington, D. C."